(12) United States Patent
Bender et al.

(10) Patent No.: US 6,207,210 B1
(45) Date of Patent: Mar. 27, 2001

(54) BROAD-RANGE ANTIBACTERIAL COMPOSITION AND PROCESS OF APPLYING TO FOOD SURFACES

(76) Inventors: Fredric G. Bender, 157 Oakwood Rd., McMurray, PA (US) 15317; William King, 140 Ygnacio Ct., Walnut Creek, CA (US) 94598; Xintian Ming, 307 W. Oak St., Cottage Grove, WI (US) 53527; George Weber, 11240 SW. Lynnvale Dr., Portland, OR (US) 97225

( * ) Notice: Subject to any disclaimer, the term of this patent is extended or adjusted under 35 U.S.C. 154(b) by 0 days.

(21) Appl. No.: 09/460,922

(22) Filed: Dec. 14, 1999

Related U.S. Application Data

(60) Provisional application No. 60/112,393, filed on Dec. 15, 1998.

(51) Int. Cl.[7] .................................................. A23B 5/14
(52) U.S. Cl. ........................ 426/335; 426/106; 426/335; 426/580; 426/615; 426/643; 426/644
(58) Field of Search .................................. 426/335, 644, 426/615, 580, 643, 106

(56) References Cited

U.S. PATENT DOCUMENTS

| 5,096,718 | 3/1992 | Ayres et al. | 426/9 |
|---|---|---|---|
| 5,217,950 | 6/1993 | Blackburn et al. | 514/2 |
| 5,260,061 | 11/1993 | Ayres et al. | 424/115 |
| 5,458,876 | 10/1995 | Monticello | 424/94.61 |
| 5,573,797 | 11/1996 | Wilhoit | 426/106 |
| 5,573,800 | 11/1996 | Wilhoit | 426/326 |
| 5,573,801 | 11/1996 | Wilhoit | 426/326 |

FOREIGN PATENT DOCUMENTS

| 0 453 860 A1 | 10/1991 | (EP) | A23L/3/3464 |
|---|---|---|---|
| 0 466 244 A1 | 1/1992 | (EP) | A23L/3/3571 |
| 7-115950 | 7/1995 | (JP) | A23L/3/3526 |

*Primary Examiner*—Helen Pratt
(74) *Attorney, Agent, or Firm*—John A. Shedden

(57) ABSTRACT

A composition of matter which demonstrates efficacy against both gram positive and gram negative bacteria containing:
(a) a gram negative bacteria inhibiting effective amount of propionibacteria metabolites with the proviso that such metabolites not solely comprise propionic acid;
(b) a gram positive bacteria inhibiting effective amount of a lantibiotic; and
(c) a chelating effective amount of one or more phosphate salts which function as a chelating agent to bind the propionibacteria metabolites and lantibiotics to the surface of the substrate being treated and its method of use is provided.

24 Claims, No Drawings

BROAD-RANGE ANTIBACTERIAL COMPOSITION AND PROCESS OF APPLYING TO FOOD SURFACES

This application claims the benefit of provisional application Ser. No. 60/112,393 filed Dec. 15, 1998.

BACKGROUND OF THE INVENTION

1. Field of the Invention

The present invention relates to substances which inhibit both gram positive and gram negative bacteria food products. More specifically, these compositions include propionibacteria metabolites, lantibiotics, and phosphate salts which function as a chelating agent to bind the propionibacteria metabolites and lantibiotics to the surface of the substrate being treated.

2. Technology Description

There has been extensive research conducted in the field of food safety to develop compositions which function as antibacterials. However, most compositions tend to have enhanced effectiveness against either gram positive or gram negative bacteria and as a result, may not be truly effective against both types of bacteria. In addition, there exists a need in the art for improved ways of chemically delivering the antibacterial to the substrate to be treated to enhance efficacy. Relevant Prior art may be found in U.S. Pat. Nos. 5,096,718 and 5,260,061 and the references cited therein. These patents disclose the use of metabolites of propionic acid bacteria in certain foods to increase the shelf life of the resulting products. These metabolites demonstrate enhanced efficacy against gram negative bacteria but are not as effective against gram positive bacteria.

JP 07-115950 suggests the combination of bacteriocins produced by lactic acid bacteria of propionibacterium in combination with either organic acids and their salts, fatty acid esters of polyhydric alcohols, amino acids, antibacterial peptides and proteins, polysaccharides comprising sugars, saccharic acids and amino sugars and their partial decomposition products, spices and their essential oils and plant components; and alcohols. The reference fails to suggest that the combination can be used to prevent the deterioration of foods as a result of mold and yeast (i.e., provide an antimycotic effect) by using the combination of bacteriocins with organic acids and their salts, fatty acid esters of polyhydric alcohols, amino acids, antibacterial peptides and proteins, polysaccharides comprising sugars, saccharic acids and amino sugars and their partial decomposition products, spices and their essential oils and plant components; and alcohols.

U.S. Pat. No. 5,217,250 suggests the use of nisin compositions as bactericides. Nisin is a lantibiotic, more specifically, a polypeptide with antimicrobial properties which is produced in nature by various strains of the bacterium *Streptococcus lactis*. Nisin is primarily effective against gram positive bacteria. This patent suggests that the combination of a chelating agent, such as EDTA or other acetate salts or citrate salts with nisin can result in a broad range bactericide.

U.S. Pat. Nos. 5,573,797; 5,593,800 and 5,573,801 disclose antibacterial compositions which include a combination of a Streptococcus or Pediococcus derived bacteriocin or synthetic equivalent antibacterial agent in combination with a chelating agent. The composition is applied to the surface of the food to be treated either by direct application or by incorporating the composition onto a flexible film casing which is placed into intimate contact with the food surface.

U.S. Pat. No. 5,458,876 suggests the combination of a lantibiotic with lysozyme as an antibacterial.

EP 0 466 244 discloses a composition having improved antibacterial properties comprises a mixture of at least one of each of the following groups of compounds: (I) a cell wall lysing substance or a salt thereof, (II) an antibacterial compound and (III) an adjuvant selected from organic acids acceptable for use in food products or preparations for cosmetic use or personal hygiene or salts of these acids, phosphates and condensed phosphates or the corresponding acids, and other sequestering agents. Preferably (I) is lysozyme, (II) may be a bacteriocin (e.g. nisin or pediocin), and (III) may be acetic acid, lactic acid, citric acid, propionic acid, tartaric acid, orthophosphates, hexametaphosphates, tripolyphosphates, other polyphosphates or sequestering agents containing substituted or non-substituted amino groups, e.g. EDTA.

EP 0 453 860 suggests the combination of nisin with a phosphate buffer effective at a pH of between 5.5. and 6.5 to eradicate gram negative bacteria from surfaces.

Despite the above teachings, there still exists a need in the art for a composition which is effective against a broad range of bacteria, specifically one which demonstrates efficacy against both gram positive and gram negative bacteria, and one which will readily attach to a substrate so that even higher levels of microbial control can be attained.

BRIEF SUMMARY OF THE INVENTION

It is now discovered, quite surprisingly, that a composition including propionibacteria metabolites, lantibiotics, and phosphate salts which function as a chelating agent to bind the propionibacteria metabolites and lantibiotics to the surface of the substrate being treated demonstrates excellent efficacy against both gram positive and gram negative bacteria. In a first embodiment, the present invention provides a composition of matter which demonstrates efficacy against both gram positive and gram negative bacteria comprising:

(a) a gram negative bacteria inhibiting effective amount of propionibacteria metabolites with the proviso that such metabolites not solely comprise propionic acid;

(b) a gram positive bacteria inhibiting effective amount of a antibiotic; and (c) a chelating effective amount of one or more phosphate salts which function as a chelating agent to bind the propionibacteria metabolites and lantibiotics to the surface of the substrate being treated.

In particularly preferred embodiments, the metabolites comprising component (a) are present in pasteurized cultured solids or liquids; component (b) comprises nisin; and component (c) comprises sodium hexametaphosphate. In even more preferred embodiments, the composition further includes a binding agent for assisting in the adherence of the antibacterial composition to the food surface being treated and a pH adjusting chemical to increase efficacy of the antimicrobial composition to adjust the pH of the composition to the pH of the substrate.

In yet another embodiment, the present invention provides a process for reducing the overall bacteria content of a food product by applying to one or more surfaces thereon a bacteria reducing effective amount of a composition of matter which demonstrates efficacy against both gram positive and gram negative bacteria comprising:

(a) a gram negative bacteria inhibiting effective amount of propionibacteria metabolites with the proviso that such metabolites not solely comprise propionic acid;

(b) a gram positive bacteria inhibiting effective amount of a lantibiotic; and (c) a chelating effective amount of one or more phosphate salts which function as a chelating agent to bind the propionibacteria metabolites and lantibiotics to the surface of the substrate being treated.

In practice the application of the composition of matter to the food surface may either be a direct application or an indirect application. In the indirect application method, the composition is applied to a substrate, such as a polymeric film material, which is then applied to the food surface to be treated. The use of the term "food surface" is defined to include any and all internal or external surfaces of the food product being treated. To this extent the concept of injecting the food product so that the inventive composition reaches the entire food is specifically contemplated.

An additional embodiment of the present invention comprises a food product having reduced bacteria as a result of having applied thereon to one or more of its surfaces a composition of matter which demonstrates efficacy against both gram positive and gram negative bacteria comprising:

(a) a gram negative bacteria inhibiting effective amount of propionibacteria metabolites with the proviso that such metabolites not solely comprise propionic acid;

(b) a gram positive bacteria inhibiting effective amount of a lantibiotic; and (c) a chelating effective amount of one or more phosphate salts which function as a chelating agent to bind the propionibacteria metabolites and lantibiotics to the surface of the substrate being treated.

It is an object of the present invention to provide a composition effective against both gram positive and gram negative bacteria.

It is a further object of the present invention to provide a process for reducing the overall bacterial content of a food product by applying to its surfaces a composition effective against both gram positive and gram negative bacteria.

An additional object of the present invention is to provide a food product having reduced levels of gram positive and gram negative bacteria.

These, and other objects, will readily be apparent to those skilled in the art as reference is made to the detailed description of the preferred embodiment.

DETAILED DESCRIPTION OF THE PREFERRED EMBODIMENT

In describing the preferred embodiment, certain terminology will be utilized for the sake of clarity. Such terminology is intended to encompass the recited embodiment, as well as all technical equivalents which operate in a similar manner for a similar purpose to achieve a similar result.

The present invention takes advantage of combining three different components to yield a composition of matter which is effective against both gram positive and gram negative bacteria.

The first component of the present invention comprises a gram negative bacteria inhibiting effective amount of propionibacteria metabolites with the proviso that such metabolites not solely comprise propionic acid. These materials are disclosed in U.S. Pat. Nos. 5,096,718 and 5,260,061. In particularly preferred embodiments, these components comprise pasteurized cultured skim milk or dextrose.

To the extent necessary for completion, the disclosures of U.S. Pat. Nos. 5,096,718 and 5,260,061 are hereby incorporated by reference. The composition as disclosed in U.S. Pat. No. 5,260,061 provides a mature propionibacterium growth medium that can provide protection, particularly against gram negative bacteria. This effect can occur without providing an undesirable flavor, odor, or appearance, even in "delicately flavored" foods.

The component is obtained by growing propionibacteria, e.g. *Propionibacterium shermanii, P. freudenreichii, P. pentosaceum, P. thoenii, P. arabinosum, P. rubrum, P. jensenii, P. peterssonii*, and related species (as identified in Malik et al., Can. J. Microbiol. 14:1185, 1968) in a milk, cheese whey, or broth medium, or other suitable nutrient mixtures. The resulting growth liquid can then be added to food and feed products to inhibit gram negative bacteria. To facilitate storage and shipment, the growth liquid may be dried to form a powder or frozen before use as an antibacterial additive. The metabolites may be separated or purified or used as a mixture. Powdered or liquid natural metabolites of propionibacteria can be incorporated into various foods and feeds to render them less susceptible to spoilage by growth and/or enzymatic activity of gram negative bacteria. Antibacterial activity may be obtained by incorporating viable propionibacteria directly into a food.

The growth medium for such Propionibacterium species may be formulated with milk or whey containing yeast extractives or fruit juices or any other broth media containing appropriate growth nutrients. The growth liquid, after development of the propionibacteria up to $10^6$ to $10^{10}$ cells per ml, may be heat treated (pasteurized) to kill the inoculated and adventitious bacteria prior to use in liquid, condensed, dried, or frozen form. It is added in various concentrations (preferred between 0.01 and 10% of total weight) to food or feed where it functions to inhibit yeasts. This inhibition enables the shelf life and storage times of the food or feed to be increased.

For the purpose of this disclosure, "metabolite" is defined as a substance, other than water, produced by propionibacteria. An "active metabolite" or an "inhibitory metabolite" is a metabolite which inhibits the growth or reproduction of gram negative bacteria.

Examples of this component are set forth hereinafter. It is intended that they be only illustrative. Propionibacterium strains identified by number are available from the American Type Culture Collection (ATCC). The other cultures are widely available or can be obtained from Oregon State University, Corvallis, Oreg., without cost. For example, *Propionibacterium freudenreichii* subsp. *shermanii*, ATCC strain #9616 can be used in accordance with the present invention.

It is discovered that Propionibacterium cultures can be used to produce a material, including one or more metabolites (other than propionic acid) that inhibit gram negative bacteria. The metabolites, which can be obtained as by-products of propionibacterial culture fermentation of skim milk or other suitable medium can serve as flavor adjuncts and may also be inhibitory to a number of microorganisms, including themselves at the finish of fermentation. The shelf-life of a food product is extended by providing in or on the product one or more of such active metabolites. The degree of inhibition achieved is much greater than is due to propionic acid alone in the mixtures of metabolites studied. In some cases where excellent inhibition occurs, the amount of propionic acid is so low as to have no measurable effect at all. This indicates that some other unidentified inhibitory substance or combination of substances in propionibacteria fermented growth mixtures may be responsible for the excellent ability of such growth mixtures to extend the shelf life of food products against yeast and mold spoilage. While not wishing to be bound to any specific theory, it is believed that metabolites (other than propionic acid) may be responsible for such performance properties.

Small amounts of viable propionibacteria are used in the manufacture of Swiss cheese to form eyes by the production of $CO_2$ and to impart the characteristic Swiss cheese flavor. In most food products, however, the presence of viable propionibacterial and Swiss cheese flavor would be unacceptable, eyes would not be desired, and $CO_2$ release may cause physical defects or bloat packaging materials.

To facilitate storage and shipping, a propionibacteria growth mixture may be evaporated and frozen, or concentrated and dehydrated, e.g., by spray-drying, or freeze-drying, to form a powder.

In most instances, substantial improvements in bacterial reduction can be obtained by adding the material in and/or applying on an amount sufficiently small that it will have no deleterious effect on the flavor or aroma of the food product. This is possible because the material includes at least one propionibacteria metabolite which is active in inhibiting gram negative bacteria and does not impart a strong flavor such as that of propionic acid. More specifically, the liquid, condensed, or dried product, which typically comprises pasteurized cultured solids or liquids, containing the propionibacteria metabolites, is added to the food product in amounts between about 0.01 to about 2.0 percent by weight of the product, more preferably between about 0.05 to about 1.0 percent by weight of the product and most preferably between about 0.1 to about 0.75 percent by weight of the product. In the case where the agent is added to a dry mix to which is added liquid ingredients and thereafter cooked, such as a cake, the amount added is by weight of the rehydrated (wet) mix prior to cooking.

Commercially available materials, more specifically pasteurized cultured solids or liquids including propionibacteria metabolites are sold by Rhodia Inc. under the MICROGARD® trademark. MICROGARD® MG 100 is a pasteurized cultured skim milk that is standardized with skim milk solids and spray dried. MICROGARD® MG 200 is a pasteurized cultured dextrose that has been standardized with maltodextrin and spray dried. MICROGARD® MG 250 is a condensed (frozen or liquid) version of the cultured dextrose product.

The next component of the inventive antibacterial composition comprises a gram positive bacteria inhibiting effective amount of a lantibiotic. The term "lantibiotics" was coined by Schnell et al. (1988. Nature 333:276–278) to describe a group of bacteriocins including nisin which contain the amino acid lanthionine and other "non-protein" amino acids. The common properties of these bacteriocins are reviewed by Kellner et al. (1988. Eur. J. Biochem 177:53–59) wherein they note that there ". . . polycyclic polypeptide antibiotics possess a high content of unsaturated amino acids (dehydroalanine, dehydrobutrine) and thioether amino acids (meso-lanthionine, (2S,3S,6R)-3-methyllanthionine). Furthermore, lysinoalanine, 3-hydroxyaspartic acid and S-(2-aminovinyl)-D-cystine are found in some members." Members of this group include nisin, subtilin, pep 5, epidermin, gallidermin, cinnamycin, Ro09-0198, duramycin and ancovenin. These ribosomally synthesized peptide antibiotics contain from 19 to 34 amino acids and are produced by various microbes including Staphlococcus species, Bacillus species and Streptomyces species. In addition to their unique composition of non-protein amino acids, they can be distinguished from other polypeptide antibiotics on the basis of their specificity. Bacteriocins in general, and the lantibiotics in particular, are characterized by a very narrow spectrum of action. Thus, only a few species of bacteria are sensitive to a particular bacteriocin at practical concentrations. This is in contrast with other broad spectrum polypeptide antibiotics, such as polymixin BI which are active against most bacteria and the "lytic peptides" discussed by Jaynes et al., in published international application WO 89/00194, which are active against most bacteria, yeasts and even mammalian cells.

Nisin occasionally occurs as a dimer with a molecular weight of about 7000. It contains several unusual amino acids including b-methyllanthionine, dehydroalanine, and lanthionine among its total of 34 amino acids. There are five unusual thio-ether linkages in the peptide which contribute to its stability in acid solutions. Nisin is one of the most thoroughly characterized bacteriocins, and shares remarkable homology of structure and action with other antibiotics, for example Subtilin and epidermin [Buchman et al 1988. J. Bio. Chem. 263 (31):16260–16266]. Recent reviews of nisin, its physical properties and uses include "Bacteriocins of Lactic Acid Bacteria", T. R. Klaenhammer, 1988. Biochimie 70:337–349, "Nisin", A. Hurst, 1981. Avd. Appl. Microbiol. 27:85–121, and U.S. Pat. No. 4,740,593. Nisin is the collective name describing several closely related substances which exhibit similar amino acid compositions, and some limited range of antibiotic activity. This phenomenon is discussed by E. Lipinska in "Antibiotics and Antibiosis in Agriculture" (M. Woodbine, Ed.) Pp. 103–130.

The use of nisin to combat L. monocytogenes has been reported by M. Doyle; "Effect of Environmental and Processing Conditions on Listeria Monocytogenes", Food Technology, 1988.42(4):169–171. This reference describes the initial inhibition of the organism's growth (for about 12 hours) and reports that L. monocytogenes may grow at a pH level as low as 5.0 and is resistant to alkaline pH with the ability to grow at pH 9.6.

Nisin is commercially available from Rhodia Inc. under the trade name MICROGARD® MG 300. In practice the lantibioitic is added to the food product in amounts between about 0.01 to about 2.0 percent by weight of the product, more preferably between about 0.05 to about 1.0 percent by weight of the product and most preferably between about 0.1 to about 0.75 percent by weight of the product.

It is also believed that use of a Pediococcus bacteria as a substitute for the lantibioitic could yield efficacious results.

The third component of the inventive antibacterial composition comprises a chelating effective amount of one or more phosphate salts which function as a chelating agent to bind the propionibacteria metabolites and lantibiotics to the surface of the substrate being treated. Generically, the phosphate salts typically are the alkali metal or alkaline earth metal salts of phosphoric acid and its derivatives. More specifically, the phosphate salts can be selected from ortho-phosphates including mono-basic, di-basic and tri-basic orthophosphates, pyrophosphates including acid pyrophosphates, polyphosphates including tripolyphosphates, tetrapolyphosphates and higher polyphosphates, metaphosphates including tetrametaphosphates and hexametaphosphates, and the like. The phosphate salts may additionally function to aid in adjusting the pH of the broad range antibacterial chemical for ideal efficacy.

Examples of specific phosphate salts which may be selected include sodium hexametaphosphate, sodium acid pyrophosphate and mixtures thereof. In practice the phosphate salt is added to the food product in amounts between about 0.001 to about 10.0 percent by weight of the product, more preferably between about 0.1 to about 5.0 percent by weight of the product and most preferably between about 0.5 to about 2.5 percent by weight of the product.

Other additives which can be present in the inventive composition include, but are not limited to the following materials: other antibacterial and/or chelating agents, natural or synthetic seasonings and/or flavors, dyes and/or colorants, vitamins, minerals, nutrients, enzymes, binding agents such as guar gum and xanthan gum and the like. In particularly preferred embodiments, guar gum is present in the inventive composition to aid in the binding of the antimicrobial components to the food surface being treated. The addition of these materials is not considered critical to the success of the present invention and would be considered within the skill of the artisan.

The antimicrobial composition of the present invention may be used in connection with any food product which is susceptible to microbial degradation. These include, but are not limited to fruits and vegetables including derived products, grain and grain derived products, dairy foods, meat, poultry and seafood. In particularly preferred embodiments, the composition is used in connection with meat, poultry and/or seafood.

A composition according to the present invention is most readily used by mixing with and/or applying on a blendable food product, but should also be effective to treat the surface of solid food products, or the interior of such products, e.g. by injection. In still other embodiments, the composition may be applied as a marinate, breading, seasoning rub, glaze, colorant mixture, and the like, the key criteria being that the antimicrobial composition be available to the surface subject to bacterial degradation. In still other embodiments, the composition may be indirectly placed into contact with the food surface by applying the composition to food packaging and thereafter applying the packaging to the food surface. The optimum amount to be used will depend on the composition of the particular food product to be treated and the method used for applying the composition to the food surface, but can be determined by simple experimentation.

The specific mechanism for why the combination yields outstanding results is not completely understood. One theory is that the use of both gram positive and gram negative antimicrobials enables an effective treatment against all types of bacterial contamination and the use of the phosphate chelating salts effectuates maximum contact between the antimicrobials with the food surface to be treated.

The following non-limiting examples illustrate the broad range antimicrobial compositions which constitute the present invention.

EXAMPLE 1

In Vitro Testing

Stock solutions of sodium hexametaphosphate (SHMP), and sodium acid phosphate (SAPP) are made at 10% and used either alone or in combination with MICROGARD® MG-200 or MG-300. The inhibition assay Is conducted at pH 5.3 and 6.0 by adjusting pH of SHMP, SAPP, MG-200 and MG-300 to 5.3 or 6.0 before adding to medium. The gram negative inhibitor, MG-200 and the gram positive inhibitor, MG-300 are prepared as 10% stock solutions. *Pseudomonas putida* is used as the gram negative indicator and *Staphylococcus aureus* is used as the gram positive indicator. The two indicator organisms are inoculated to Lactose broth (pH 5.3) respectively at about $10^5$ CFU/ml and incubated at 30° C. for 24 hours. Growth of the inoculum is monitored by optical density (OD 550). The results are shown in the table below.

| Treatment | A 550 *P. putida* (Gram negative inhibition) | | A 550 *S. aureus* (Gram + inhibit.) |
|---|---|---|---|
| | pH 5.3 | pH 6.0 | pH 5.3 |
| None | 0.17 | 0.27 | 0.33 |
| SHMP 0.01% | ND | ND | 0.19 |
| 0.05% | ND | ND | 0 |
| 0.1% | 0.09 | 0.16 | 0 |
| 0.5% | 0 | 0 | 0 |
| 1% | 0 | 0 | 0 |
| SAPP 0.1% | 0.19 | ND | 0.20 |
| 0.5% | 0.22 | ND | 0 |
| 1% | 0.20 | ND | 0 |
| SHMP 0.5% + SAPP 0.5% | 0.19 | ND | 0 |
| SHMP 0.1% + SAPP 1% | 0.15 | ND | 0 |
| MG-200 0.05% | 0.07 | ND | MG-300, 0.5% 0.18 |
| MG-200 0.1% | 0.03 | 0.21 | 0.01 SHMP + 0.17 0.5% MG300 |
| MG-200 0.05% + 0.1% SHMP | 0 | ND | 0.05% SHMP + 0.12 0.5% MG300 |
| MG-200 0.1% + 0.1% SHMP | ND | 0.11 | 0.5% SAPP + 0.20 0.5% MG300 |
| MG-200 0.05% + 0.5% SHMP | 0 | ND | 0.5% MG300, 0.05 SAPP, SHMP |
| MG-200 0.1% + 0.5% SHMP | 0 | 0.07 | |
| MG-200 0.1% + 0.5% SHMP, 0.5% SAPP | 0.08 | ND | |

EXAMPLE 2

Poultry Treatment

Poultry carcass halves are irradiated and then inoculated with both gram positive and gram negative bacteria to obtain a target concentration of each of $1\times10^5$ cfu/ml in an inoculum volume of 200 liters. More specifically, 1.0 ml of *E. coli* at $2\times10^{10}$ cfu/ml, 2.7 ml of *Pseudomonas flourescens* at $7.5\times10^9$ cfu/ml, 1.5 ml of *Comybacterium aminovalericum* at $1.3\times10^{10}$ cfu/ml and 3.6 ml of Acintobacter sp. at $5.5\times10^9$ cfu/ml are used. The required quantities are added to 200 liters of distilled room temperature water and mixed. The irradiated poultry is added to the inoculum bath in a 50° F. room for 1 hour and 15 minutes, allowing for bacterial attachment, then removed to drain.

The inoculated drained carcass halves are subjected to the following treatments for an average of 10 seconds within a range of about 5 to 15 seconds. The treated halves are allowed to drain then placed into individual plastic bags. The halves are then placed in a 38° F. room for storage for the duration of the study. The treatments are as follows, where SAPP represents sodium acid pyrphosphate, SHMP represents sodium hexametaphosphate, MG200 represents MICROGARD®MG-200 (Rhodia Inc., Cranbury, N.J.) and MG300 represents MICROGARD®MG-300 (Rhodia Inc., Cranbury, N.J.). For each of the different treatment solutions, deionized water is added to make a total weight percentage of 100. All percentages are listed as weight percents.:

| Treatment Code | % SAPP | % SHMP | % MG200 | % MG300 |
|---|---|---|---|---|
| A | 0 | 0 | 0 | 0 |
| B | 5 | 0 | 0 | 0 |
| C | 0 | 5 | 0 | 0 |
| D | 0 | 0 | 5 | 0 |
| E | 0 | 0 | 0 | 5 |
| F | 5 | 5 | 5 | 5 |
| G | 7.5 | 2.5 | 7.5 | 2.5 |
| H | 2.5 | 7.5 | 2.5 | 7.5 |

Results obtained by the testing of the efficacy of each of these treatments against the inoculation solution at times of 0, 3 and 7 days after treatment are shown in the following tables. Three replications for each sample are used except that six samples are taken for inoculated birds. Results are listed in cfu/ml.

Abbreviations for the tables are as follows:
WB=water before inoculum
WA=water after inoculum
IB=inoculated bird
P+A=amount of *Pseudomonas flourescens* and Acintobacter sp
Total Count=total gram positive and gram negative bacteria DAY 0 Results:

| Treatment | | pH | E. coli | P + A* | Total count |
|---|---|---|---|---|---|
| WB-1 | | 6 | <10 | <10 | <10 |
| WB-2 | | 6 | <10 | <10 | <10 |
| WB-3 | | 6 | <10 | <10 | <10 |
| | Ave. | 6 | <10 | <10 | <10 |
| | Log | | | | |
| WA-1 | | 6 | 9000 | 8300 | 100000 |
| WA-2 | | 6 | 1000 | 18000 | 94000 |
| WA-3 | | 6 | 9000 | 10000 | 100000 |
| | Ave. | 6 | 6333 | 12100 | 98000 |
| | Log | | 3.8 | 4.1 | 5.0 |
| IB-1 | | 6 | 6000 | 42000 | 6000 |
| IB-2 | | 6 | 6500 | 48000 | 6000 |
| IB-3 | | 6 | 8600 | 70000 | 8100 |
| IB-4 | | 6 | 7500 | 64000 | 7000 |
| IB-5 | | 6 | 6600 | 47000 | 6000 |
| IB-6 | | 6 | 6000 | 86000 | 2300 |
| | Ave. | 6 | 6867 | 59500 | 5900 |
| | Log | | 3.8 | 4.8 | 3.8 |
| A1 | | 6.7 | 5500 | 84000 | 1600 |
| A2 | | 6.2 | 4700 | 120000 | 1800 |
| A3 | | 6.2 | 2200 | 56000 | 2500 |
| | Ave. | 6.4 | 4133 | 86667 | 1967 |
| | Log | | 3.6 | 4.9 | 3.3 |
| B1 | | 6.3 | 1200 | 81000 | 5500 |
| B2 | | 6.3 | 1200 | 45000 | 6600 |
| B3 | | 6.2 | 1600 | 46000 | 1700 |
| | Ave. | 6.3 | 1333 | 57333 | 4600 |
| | Log | | 3.1 | 4.8 | 3.7 |
| C1 | | 6.7 | 1800 | 120000 | 4300 |
| C2 | | 6.7 | 1500 | 50000 | 5800 |
| C3 | | 6.7 | 2000 | 85000 | 6000 |
| | Ave. | 6.7 | 1767 | 85000 | 5367 |
| | Log | | 3.2 | 4.9 | 3.7 |
| D1 | | 5.8 | 2300 | 69000 | 6800 |
| D2 | | 5.8 | 2200 | 110000 | 4700 |
| D3 | | 5.9 | 1300 | 56000 | 7000 |
| | Ave. | 5.8 | 1933 | 78333 | 6167 |
| | Log | | 3.3 | 4.9 | 3.8 |
| E1 | | 6.5 | 1700 | 840000 | 6900 |
| E2 | | 6.6 | 2400 | 55000 | 8500 |
| E3 | | 6.5 | 3300 | 130000 | 4600 |
| | Ave. | 6.5 | 2467 | 341667 | 6667 |
| | Log | | 3.4 | 5.5 | 3.8 |
| F1 | | 6.1 | 100 | 600 | 7800 |
| F2 | | 6.3 | 1100 | 7700 | 5200 |
| F3 | | 6.3 | 770 | 13000 | 6900 |
| | Ave. | 6.3 | 657 | 7100 | 6633 |
| | Log | | 2.8 | 3.9 | 3.8 |
| G1 | | 6.2 | 1800 | 4800 | 5700 |
| G2 | | 6.2 | 1100 | 7300 | 4600 |
| G3 | | 6.1 | 2000 | 8200 | 7100 |
| | Ave. | 6.2 | 1633 | 6767 | 5800 |
| | Log | | 3.2 | 3.8 | 3.8 |
| H1 | | 6.4 | 2700 | 9300 | 11000 |
| H2 | | 6.4 | 3200 | 9400 | 5900 |
| H3 | | 6.5 | 2500 | 6600 | 26000 |
| | Ave. | 6.4 | 2800 | 8433 | 14300 |
| | Log | | 3.4 | 3.9 | 4.2 |

Day 3 Results:

| | | pH | E. coli | P + A* | Total count |
|---|---|---|---|---|---|
| A4 | | | 1.00E+04 | 2.90E+08 | 4.80E+08 |
| A5 | | | 5.00E+03 | 2.10E+08 | 2.70E+08 |
| A6 | | | 6.00E+03 | 2.50E+08 | 2.80E+09 |
| | Ave. | 6.6 | 7.00E+03 | 2.50E+08 | 1.18E+09 |
| | Log | | 3.85 | 8.40 | 9.07 |
| B4 | | | 1.00E+04 | 1.50E+08 | 1.70E+08 |
| B5 | | | 2.00E+03 | 2.60E+08 | 3.10E+08 |
| B6 | | | 3.00E+03 | 1.70E+08 | 1.90E+08 |
| | Ave. | 6.5 | 5.00E+03 | 1.93E+08 | 2.23E+08 |
| | Log | | 3.70 | 8.29 | 8.35 |
| C4 | | | 1.00E+04 | 2.30E+08 | 2.60E+08 |
| C5 | | | 1.00E+03 | 1.80E+08 | 2.50E+08 |
| C6 | | | 1.00E+03 | 3.00E+08 | 3.20E+08 |
| | Ave. | 6.5 | 4.00E+03 | 2.37E+08 | 2.77E+08 |
| | Log | | 3.60 | 8.37 | 8.44 |
| D4 | | | 3.00E+03 | 1.20E+07 | 2.30E+07 |
| D5 | | | 1.00E+03 | 1.50E+07 | 3.60E+07 |
| D6 | | | 1.00E+04 | 1.00E+07 | 1.30E+07 |
| | Ave. | 5.8 | 4.67E+03 | 1.23E+07 | 2.40E+07 |
| | Log | | 3.67 | 7.09 | 7.38 |
| E4 | | | 2.00E+03 | 1.90E+08 | 2.50E+07 |
| E5 | | | 1.00E+03 | 8.50E+07 | 8.80E+07 |
| E6 | | | 1.00E+04 | 2.60E+08 | 3.30E+08 |
| | Ave. | 6.7 | 4.33E+03 | 1.78E+08 | 1.48E+08 |
| | Log. | | 3.64 | 8.25 | 8.17 |
| F4 | | | 1.00E+03 | 8.80E+06 | 9.50E+06 |
| F5 | | | 1.00E+03 | 2.20E+06 | 4.20E+06 |
| F6 | | | 3.00E+03 | 5.90E+06 | 8.40E+06 |
| | Ave. | 6.3 | 1.67E+03 | 5.63E+06 | 7.37E+06 |
| | Log | | 3.22 | 6.75 | 6.87 |
| G4 | | | 1.80E+03 | 5.70E+04 | 1.80E+05 |
| G5 | | | 1.00E+03 | 1.70E+06 | 8.60E+06 |
| G6 | | | 2.00E+03 | 8.30E+06 | 9.50E+06 |
| | Ave. | 6.2 | 1.60E+03 | 3.35E+06 | 6.09E+06 |
| | Log | | 3.20 | 6.53 | 6.78 |
| H4 | | | 3.00E+03 | 9.50E+06 | 2.40E+07 |
| H5 | | | 1.00E+04 | 8.20E+06 | 1.40E+07 |
| H6 | | | 2.00E+03 | 1.50E+06 | 2.10E+07 |
| | Ave. | 6.4 | 5.00E+03 | 6.40E+06 | 1.97E+07 |
| | Log. | | 3.70 | 6.81 | 7.29 |

Day 7 Results:

| Treatment | | pH | E. coli | P + A* | Total count |
|---|---|---|---|---|---|
| A7 | | 6.8 | 1.00E+03 | 5.00E+09 | 7.00E+09 |
| A8 | | 6.7 | 1.00E+03 | 3.60E+09 | 3.50E+09 |
| A9 | | 6.8 | 1.00E+03 | 4.50E+09 | 5.60E+09 |
| | Ave. | | 1.00E+03 | 4.37E+09 | 5.37E+09 |
| | Log | | 3.00 | 9.64 | 9.73 |
| B7 | | 6.4 | 1.00E+03 | 2.10E+09 | 3.30E+09 |
| B8 | | 6.5 | 1.00E+03 | 3.40E+09 | 3.40E+09 |
| B9 | | 6.5 | 1.00E+03 | 3.60E+09 | 3.50E+09 |
| | Ave. | | 1.00E+03 | 3.03E+09 | 3.40E+09 |
| | Log | | 3.00 | 9.48 | 9.53 |

-continued

| | | | | |
|---|---|---|---|---|
| C7 | 6.7 | | 2.00E+03 | 2.30E+09 | 3.50E+09 |
| C8 | 6.7 | | 1.00E+03 | 3.60E+09 | 3.70E+09 |
| C9 | 6.6 | | 1.00E+03 | 3.00E+09 | 3.20E+09 |
| | | Ave. | 1.33E+03 | 2.97E+09 | 3.47E+09 |
| | | Log | 3.12 | 9.47 | 9.54 |
| D7 | 6.7 | | 1.00E+03 | 1.20E+09 | 2.30E+09 |
| D8 | 6.7 | | 1.00E+03 | 2.60E+09 | 3.60E+09 |
| D9 | 6.7 | | 1.00E+03 | 2.80E+09 | 3.30E+09 |
| | | Ave. | 1.00E+03 | 2.20E+09 | 3.07E+09 |
| | | Log | 3.00 | 9.34 | 9.49 |
| E7 | 6.9 | | 1.00E+03 | 2.20E+09 | 2.50E+09 |
| E8 | 6.7 | | 1.00E+03 | 3.50E+09 | 3.60E+09 |
| E9 | 6.7 | | 1.00E+03 | 3.30E+09 | 3.50E+09 |
| | | Ave. | 1.00E+03 | 3.00E+09 | 3.20E+09 |
| | | Log | 3.00 | 9.48 | 9.51 |
| F7 | 6.3 | | 1.00E+03 | 1.50E+09 | 2.50E+09 |
| F8 | 6.3 | | 1.00E+03 | 1.80E+09 | 2.20E+09 |
| F9 | 6.4 | | 3.00E+03 | 1.30E+09 | 1.70E+09 |
| | | Ave. | 1.67E+03 | 1.53E+09 | 2.13E+09 |
| | | Log | 3.22 | 9.19 | 9.33 |
| G7 | 6.3 | | 1.00E+03 | 4.00E+08 | 4.80E+08 |
| G8 | 6.2 | | 1.00E+03 | 1.70E+09 | 2.00E+09 |
| G9 | 6.3 | | 1.00E+03 | 6.80E+08 | 7.50E+09 |
| | | Ave. | 1.00E+03 | 9.27E+08 | 3.33E+09 |
| | | Log | 3.00 | 8.97 | 9.52 |
| H7 | 6.4 | | 2.00E+03 | 2.50E+09 | 2.70E+09 |
| H8 | 6.4 | | 1.00E+03 | 1.20E+09 | 1.40E+09 |
| H9 | 6.5 | | 1.00E+03 | 1.30E+09 | 1.60E+09 |
| | | Ave. | 1.33E+03 | 1.67E+09 | 1.90E+09 |
| | | Log | 3.12 | 9.22 | 9.28 |

The results indicate the initial distilled water to be very clean as no bacteria is detected in the WB (Water Before inoculum) samples. The initial bacterial load is close to target in the WA (Water After inoculum) samples. In the inoculum the total plate count (TPC) is log 5.0 with Pseudomonas and Acintobacter at log 4.1. $E.\ coli$ is at log 3.8.

The six carcass halves IB 1–6 (Inoculated Bird) which represent the initial loading are sampled prior to any treatment and show excellent consistency. TPC with an average of log 3.8 ranges from $2.3 \times 10^3$ to $8.1 \times 10^3$. Pseudomonas and Acintobacter together have a range of from $4.2 \times 10^4$ to $8.6 \times 10^4$ with an average of log 4.8. $E.\ coli$ ranges from $6 \times 10^3$ to $8.6 \times 10^3$ with an average of log 3.8.

The results obtained on day 3 validate the concept of a synergistic effect between MG and polyphosphate. Specifically, SAPP (B) has a P+A of log 8.3 (−0.1) versus log 8.4 for the Control (A) while MG 200 (D) has log 7.1 (−1.3). The polyphosphate/MicroGard combinations (F,G,H) have log 6.8 (−1.6), log 6.5 (−1.9) and log 6.8 (−1.6) respectively. The greatest reduction of P+A is Treatment G which is weighted more heavily towards Gram negative control. This effect apparently continues out towards day 7 with a log 9.0 P+A versus log 9.2 for treatments F and H. Sampling has to be discontinued after day 7 due to bacterial growth.

Having described the invention in detail and by reference to the preferred embodiments thereof, it will be apparent that modifications and variations are possible without departing from the scope of the appended claims.

What is claimed is:

1. A composition of matter which demonstrates efficacy against both gram positive and gram negative bacteria comprising:
   (a) a gram negative bacteria inhibiting effective amount of propionibacteria metabolites with the proviso that such metabolites not solely comprise propionic acid;
   (b) a gram positive bacteria inhibiting effective amount of a lantibiotic; and
   (c) a chelating effective amount of one or more phosphate salts which function as a chelating agent to bind the propionibacteria metabolites and lantibiotics to the surface of the substrate being treated.

2. The composition according to claim 1 wherein said metabolites are present in pasteurized cultured solids or liquids.

3. The composition according to claim 2 wherein said propionibacteria metabolites comprise cultured skim milk solids or cultured dextrose.

4. The composition according to claim 1 wherein said lantibiotic comprises nisin.

5. The composition according to claim 1 wherein said one or more phosphate salts are selected from the group consisting of orthophosphates, pyrophosphates, polyphosphates, metaphosphates and mixtures thereof.

6. The composition according to claim 5 wherein said one or more phosphate salts comprises sodium hexametaphosphate, sodium acid pyrophosphate or mixtures thereof.

7. The composition according to claim 1 further comprising one or more of the following components: other antibacterial and/or chelating agents, natural or synthetic seasonings and/or flavors, dyes and/or colorants, vitamins, minerals, nutrients, enzymes, and binding agents.

8. The composition according to claim 7 wherein said composition includes a binding agent which is guar gum.

9. A process for reducing the overall bacteria content of food product by applying to one or more surfaces of said product a bacteria reducing effective amount of a composition of matter which demonstrates efficacy against both gram positive and gram negative bacteria comprising:
   (a) a gram negative bacteria inhibiting effective amount of propionibacteria metabolites with the proviso that such metabolites not solely comprise propionic acid;
   (b) a gram positive bacteria inhibiting effective amount of a lantibiotic; and
   (c) a chelating effective amount of one or more phosphate salts which function as a chelating agent to bind the propionibacteria metabolites and lantibiotics to the surface of the substrate being treated.

10. The process according to claim 9 wherein said food product is selected from the group consisting of fruits and fruit derived products, vegetables and vegetable derived products, grain and grain derived products, dairy foods, meat, poultry and seafood and mixtures thereof.

11. The process according to claim 10 wherein said food product is either meat, poultry or seafood.

12. The process according to claim 9 wherein said composition is either directly applied to said food surface or applied to food packaging material which is thereafter brought into contact with said food surface.

13. The process according to claim 12 wherein said composition is directly applied to said food surface by means of mixing or injecting, or wherein said composition is included in a marinate, breading, seasoning rub, glaze or colorant mixture which is applied to said food surface.

14. The process according to claim 9 wherein, per 100 total parts by weight of said food product, about 0.01 to about 2.0 parts of component (a) are added, about 0.01 to about 2.0 parts of component (b) are added and 0.001 to about 10.0 parts of component (c) are added.

15. The process according to claim 14 wherein, per 100 total parts by weight of said food product, about 0.05 to about 1.0 parts of component (a) are added, about 0.05 to about 1.0 parts of component (b) are added and 0.1 to about 5.0 parts of component (c) are added.

16. The process according to claim 15 wherein, per 100 total parts by weight of said food product, about 0.1 to about 0.75 parts of component (a) are added, about 0.1 to about 0.75 parts of component (b) are added and 0.5 to about 2.5 parts of component (c) are added.

17. A food product having reduced bacteria as a result of having applied thereon to one or more of its surfaces a composition of matter which demonstrates efficacy against both gram positive and gram negative bacteria comprising:
   (a) a gram negative bacteria inhibiting effective amount of propionibacteria metabolites with the proviso that such metabolites not solely comprise propionic acid;
   (b) a gram positive bacteria inhibiting effective amount of a antibiotic; and
   (c) a chelating effective amount of one or more phosphate salts which function as a chelating agent to bind the propionibacteria metabolites and antibiotics to the surface of the substrate being treated.

18. The product according to claim 17 which is selected from the group consisting of fruits and fruit derived products, vegetables and vegetable derived products, grain and grain derived products, dairy foods, meat, poultry and seafood and mixtures thereof.

19. The product according to claim 18 which is either meat, poultry or seafood.

20. The product according to claim 17 wherein said composition is either directly applied to said food surface or applied to food packaging material which is thereafter brought into contact with said food surface.

21. The product according to claim 20 wherein said composition is directly applied to said food surface by means of mixing or injecting, or wherein said composition is included in a marinate, breading, seasoning rub, glaze or colorant mixture which is applied to said food surface.

22. The product according to claim 17 wherein, per 100 total parts by weight of said food product, about 0.01 to about 2.0 parts of component (a) are added, about 0.01 to about 2.0 parts of component (b) are added and 0.001 to about 10.0 parts of component (c) are added.

23. The product according to claim 21 wherein, per 100 total parts by weight of said food product, about 0.05 to about 1.0 parts of component (a) are added, about 0.05 to about 1.0 parts of component (b) are added and 0.1 to about 5.0 parts of component (c) are added.

24. The product according to claim 23 wherein, per 100 total parts by weight of said food product, about 0.1 to about 0.75 parts of component (a) are added, about 0.1 to about 0.75 parts of component (b) are added and 0.5 to about 2.5 parts of component (c) are added.

* * * * *